(12) United States Patent
Bowie

(10) Patent No.: US 9,057,447 B2
(45) Date of Patent: Jun. 16, 2015

(54) LOW PRESSURE HOT TAP PIPELINE ISOLATION

(71) Applicant: STATS (UK) Limited, Aberdeen (GB)

(72) Inventor: Angus George Bowie, Aberdeen (GB)

(73) Assignee: STATS (UK) Limited, Aberdeenshire (GB)

( * ) Notice: Subject to any disclaimer, the term of this patent is extended or adjusted under 35 U.S.C. 154(b) by 124 days.

(21) Appl. No.: 13/756,704

(22) Filed: Feb. 1, 2013

(65) Prior Publication Data

US 2013/0192695 A1    Aug. 1, 2013

(30) Foreign Application Priority Data

Feb. 1, 2012    (GB) .................................. 1201724.0

(51) Int. Cl.
| | |
|---|---|
| *F16L 55/10* | (2006.01) |
| *F16K 15/00* | (2006.01) |
| *F16L 55/124* | (2006.01) |
| *F16L 55/132* | (2006.01) |
| *G01M 3/28* | (2006.01) |

(52) U.S. Cl.
CPC ............... *F16K 15/00* (2013.01); *F16L 55/124* (2013.01); *F16L 55/132* (2013.01); *G01M 3/2853* (2013.01)

(58) Field of Classification Search
CPC ...... F16L 55/124; F16L 55/132; G01M 3/022
USPC ................................................ 138/94, 93, 89
See application file for complete search history.

(56) References Cited

U.S. PATENT DOCUMENTS

| | | | | |
|---|---|---|---|---|
| 1,181,984 A |  | 5/1916 | Arni | |
| 1,747,933 A | * | 2/1930 | Goodman et al. | ............... 138/94 |
| 2,010,200 A | * | 8/1935 | Hans Rufener et al. | ...... 220/246 |
| 4,040,450 A | * | 8/1977 | Boundy | .......................... 138/94 |
| 4,817,671 A | * | 4/1989 | Mathison et al. | ............... 138/89 |
| 4,875,615 A |  | 10/1989 | Savard | |
| 5,082,026 A | * | 1/1992 | Smith | .............................. 138/94 |
| 5,844,127 A |  | 12/1998 | Berube et al. | |
| 6,062,262 A | * | 5/2000 | Tash | ............................... 138/89 |
| 7,281,543 B2 | * | 10/2007 | Calkins et al. | ............. 137/15.12 |
| 7,841,364 B2 | * | 11/2010 | Yeazel et al. | ..................... 138/92 |

(Continued)

FOREIGN PATENT DOCUMENTS

| | | |
|---|---|---|
| DE | 2457412 | 6/1976 |
| EP | 2320120 | 5/2011 |

(Continued)

OTHER PUBLICATIONS

United Kingdom Search Report for Application No. 1201724.0 dated May 29, 2012.

(Continued)

*Primary Examiner* — Patrick F Brinson
(74) *Attorney, Agent, or Firm* — Carlson, Gaskey & Olds, P.C.

(57) ABSTRACT

An isolation tool assembly for use in isolating a section of a pipe has a seal unit in the form of spherical globe seal module and a lock arrangement. The seal module has a first body portion onto which are mounted two compression seal elements. In use, the seal elements engage the pipe to isolated the section of pipe and the lock arrangement prevents undesired deactivation of the seal elements where the pressure applied across the seal elements drops below a seal self-energization pressure.

18 Claims, 4 Drawing Sheets

(56) References Cited

U.S. PATENT DOCUMENTS

| | | | |
|---|---|---|---|
| 7,849,882 B1 * | 12/2010 | Lee et al. | 138/94 |
| 7,866,347 B2 * | 1/2011 | Bowie | 138/94 |
| 2005/0241710 A1 | 11/2005 | Early et al. | |

FOREIGN PATENT DOCUMENTS

| | | |
|---|---|---|
| GB | 2117863 | 10/1983 |
| GB | 2440275 | 1/2008 |
| GB | 2456229 | 7/2009 |
| GB | 2474883 | 5/2011 |
| WO | 2007/141554 | 12/2007 |

OTHER PUBLICATIONS

European Search Report for EP Application No. EP13153742.5 dated Mar. 4, 2014.

* cited by examiner

LOW PRESSURE HOT TAP PIPELINE ISOLATION

REFERENCE TO RELATED APPLICATIONS

The application claims priority to United Kingdom Application No. 1201724.0 which was filed on Feb. 1, 2012.

FIELD OF THE INVENTION

The present invention relates to an isolation tool for use in a pipe and more particularly, but not exclusively to an isolation tool for use in isolating a section of a pipe transporting fluids such as oil, gas or the like.

BACKGROUND TO THE INVENTION

The oil and gas industry has for many years used hot tapping and line stop techniques in order to provide localised isolation of a "live" section of pipe.

Hot tapping involves the fitting of a branch or tee connection to a live pipeline containing fluid at pressure. The connection may be welded or mechanically secured to the pipe, a valve being subsequently fitted to the connection. A tapping or drilling tool is then connected to the valve, the tapping tool being activated to pass through the open valve and drill through the pipe wall to create the branch. The tapping tool is configured to prevent leakage of fluid from the pipe during the pipe cutting operation. On completion of the drilling process, the tapping tool may be removed and the valve closed to complete the branch connection. Thus, fluid may be selectively directed via the branch connection. Alternatively, or in addition, tools may be inserted and/or removed via the hot tap connection to perform a variety of tasks within the pipe.

Conventionally, where pipe isolation is required, a plug or line stop tool including a lip seal is inserted through the tap connection to provide uni-directional sealing isolation of the pipe inboard, or downstream, of the stopple. In order to apply a test pressure to test the integrity of the stopple seal a second opening is cut into the pipe at a location outboard, or upstream, from the first opening and a second plug or stopple put in place. A smaller third opening is drilled between the first and second openings to pressurize the isolated area between the first and second stopples, and thus pressure test the first or primary stopple seal, and also the second seal. This may only be achieved if the uni-directional lip seal arrangement of the second stopple is arranged against the prevailing pressure, that is in the opposite orientation to the first or primary seal. Thus, although two pressure-tested seals have been provided, only one, the primary seal, is effective against the isolated pressure. In addition, each intervention into the pipe requires additional planning, setup and operation time resulting in increased costs for the operator.

Applicant's BISEP double block and bleed hot tap installed isolation device, as described in GB 2,440,275, which is incorporated herein in its entirety by way of reference, provides an alternative solution. The BISEP device may be installed through a branch connection and a seal unit in the form of a spherical or globe seal module rotated to face outboard or upstream and hydraulically or otherwise activated to seal with the pipe upstream of the branch. The branch and the pipe inboard or downstream of the device are then isolated from upstream pipe pressure. The seal module carries a pair of seal elements and the module is configured such that the pressure differential acting across the module further energises the seal elements. Thus, in the event of a failure of the external seal activation, isolation is maintained. Furthermore, an annular chamber between the seal elements may be pressurised to confirm the integrity of both seal elements.

The arrangement of the seal element also permits the BISEP device to be utilised as a weld test tool, by locating the seal elements straddling a weld, and then pressurising the annulus between the seal elements.

SUMMARY OF THE INVENTION

According to a first aspect of the present invention, there is provided an isolation tool for use in isolating a section of a pipe, the isolation tool including a seal unit adapted for location in a section of a pipe via an opening in the pipe wall and including at least two seal elements configured to engage the pipe wall to isolate a section of pipe. The seal unit is configured for coupling to a lock arrangement operable to prevent de-activation of the seal elements to maintain isolation of the section of the pipe.

The seal unit may be provided separately from the lock arrangement. Alternatively, part or all of the lock arrangement may be provided together with the seal unit to form an isolation tool assembly. Thus, the seal unit and the lock arrangement may together form an assembly or kit of parts. The assembly may, for example, be configured so as to be interchangeable with an isolation tool seal unit such as described in GB 2,440,275.

According to a further aspect of the present invention there is provided an isolation tool assembly for isolating a section of a pipe, the isolation tool including a seal unit adapted for location in a section of a pipe via an opening in the pipe wall and including at least two seal elements configured to engage a pipe wall to isolate a section of pipe. A lock arrangement is operable to prevent de-activation of the seal elements to maintain isolation of the section of the pipe.

Embodiments of the present invention provide a double block isolation tool providing a dual seal unit for use in isolating a section of pipe via a single intervention into the pipe. Beneficially, the use of a single bore entry of the type described reduces the operation time and cost involved in isolating the required section of pipe.

Moreover, the lock arrangement may be configured to prevent undesired deactivation of the seal elements where the pressure applied across the seal elements drops below a seal self-energization pressure (the differential pressure required to provide fail safe activation of the seals). Embodiments of the present invention thus provide the additional benefit of providing fail-safe operation in applications where the pressure acting across the tool is insufficient to maintain self-energization of the seal elements, for example, facilitating double block and bleed capability in low pressure or ambient pressure pipe isolations.

It will be understood that reference to the term pipe includes any tubular construction including an oil or gas pipeline, whether subsea, above or below ground, downhole tubing, or indeed any other tubular suitable for transport or storage of fluids.

The tool may include a seal actuator operable to urge the seal elements into sealing engagement with the pipe wall and the lock arrangement may be configured to prevent movement of the seal actuator to a position which would otherwise de-activate the seals.

The lock arrangement may be of any suitable form and construction. For example, the lock arrangement may include at least one of, or a combination of, a mechanical lock arrangement, hydraulic lock arrangement, pneumatic lock arrangement or the like. In some embodiments, the lock arrangement may include a ratchet arrangement, a latch arrangement and/or a tension cable. In particular embodiments, the lock arrangement includes a combination of mechanical and hydraulic locks.

The lock arrangement may further include a lock member formed as part of, coupled to, the seal actuator. The lock member may be of any suitable form and construction. For example, the lock member may include a spigot. In particular embodiments, the lock member may include a cap screw.

The lock arrangement may further include a lock piston for engaging the lock member. In use, the lock piston may be configured to engage the lock member and prevent retraction of the lock member, and the associated seal actuator, to the position which would de-activate the seals. In embodiments where the lock member includes a cap screw, the lock piston may be configured to engage a head of the cap screw to prevent retraction of the lock member. The lock piston may be radially mounted relative to the lock member and the seal actuator, this providing maximum shear area.

The lock arrangement may be configured to prevent movement of the seal actuator in either direction. However, in preferred embodiments, the lock arrangement may be configured to prevent movement of the seal actuator in one direction, in particular in the direction which would deactivate the seals.

Any suitable means for moving the lock piston for engaging the lock piston may be provided. For example, the lock piston may be moved from the first position to the second position mechanically. In particular embodiments, the lock piston may be moved from the first position to the second position by a fluid pressure force. In use, a pressurized fluid may be inserted into a chamber, insertion of the fluid driving the lock piston into engagement with the lock member.

Any suitable means for unlocking the lock arrangement may be provided. For example, unlocking the lock arrangement may be achieved by at least one of mechanically, hydraulically, pneumatically. In particular embodiments, the lock arrangement may be unlocked hydraulically. In use, a hydraulic pressure force may be applied to the lock piston to disengage the lock piston from the lock member and permit the lock member to move.

The seal actuator may include a fluid piston, the piston being adapted to translate to provide compression of the seal elements. In a preferred embodiment, axial compression of the seal elements deforms the elements radially outwards into contact with the circumferential wall of the pipe to provide a seal therebetween. Alternatively or in addition, the seal actuator may be adapted to translate by application of a pressure differential across the actuator. The pressure differential may be induced by applying or providing an elevated pressure outboard of the seal unit in the pipe. Alternatively, or in addition, the differential pressure may be induced by venting fluid to create a lower pressure region inboard of the seal unit.

The isolation tool may be adapted to be inserted into the pipe through a hot tap or the like, or through an established or existing branch, tee or opening.

At least one of the seal elements may be capable of sealing the section of pipe. In particular, in preferred embodiments of the invention either of the seals may be capable of resisting the full differential pressure between the pressurized portion of the pipe and the isolated portion of the pipe.

At least one of the seal elements may be a bi-directional seal. Accordingly, either or both of the seal elements may provide full sealing capability.

At least one of the seal elements includes an elastomeric seal.

At least one of the seal elements may include a compression seal, that is a seal that is set or energized by compressing the seal. Most preferably, both seal elements include compression seals.

The seal elements may be adapted to be compliant to the pipe surface. Thus, seal integrity may be maintained where the inner surface of the pipe is irregular or has been subject to damage.

The seal elements may be adapted to be self-energizing on the seal unit experiencing a predetermined differential pressure.

The seal elements may be actuated at least in part mechanically, hydraulically or by any other suitable means. The actuation force may be externally applied. Alternatively, or in addition, a differential pressure across the seal unit may actuate the seal elements. In a preferred embodiment, a predominant proportion of the load generated on the seal unit by the pipe or differential pressure is transmitted through the seal unit to the seal elements, which may be annular. Thus, as the cross-sectional area of the annular seal elements is less than the pipe cross-sectional area and of the seal unit, the pressure transmitted through the seal elements is greater than the pipe pressure, thus preventing bypass of fluid around the seal and assisting in prevention of explosive decompression of the seal.

The seal elements may be adapted to be initially compressed to provide at least initial isolation of the pipe. This is advantageous in particular where the tool is used in lower pressure applications.

At least one anti-extrusion spring may be provided for each seal element. Thus, the seal member is prevented from extruding when exposed to high differential pressures or high compressive loads.

The seal unit may be adapted to be introduced into a pipe via a branch, which will typically be perpendicular to the pipe axis. The seal unit may be adapted to pass through the branch in alignment with the branch axis and then be rotated for alignment with the pipe axis. The seal unit may be adapted to be rotated through approximately 90 degrees. Seal unit rotation may be actuated at least in part hydraulically, mechanically, by a combination of hydraulic and mechanical actuation or by any other suitable means.

The seal unit may include a location linkage, which may include a clevis. The location linkage may include a support member, which may include a padeye. The location linkage may be configured to locate the seal unit spaced from the branch, for example a dimension of a location linkage clevis, such as the length of the clevis, may be selected to control the axial positioning of the seal unit within the pipe.

The clevis, in particular a clevis pin, may be configured to resist back pressure. This allows the inboard pressure, previously isolated, to be raised above the pipeline pressure to facilitate a strength test on the repaired pipework. In use, the bi-directional capability of the seals then provides the facility to pressure test the isolated pipe prior to removing the tool. Venting the annulus between the seals will maintain the sealing pressure under the back pressure test to prevent overloading of the seal actuator.

Where the seal unit is rotatable, the linkage between the seal unit and a support member may be adapted to support loads applied by the seal unit to the support member by abutting faces in addition to any loads transferred between the seal unit and the support member via a pivot pin or hinge.

The seal unit may include a seal actuator including a fluid piston, the piston being adapted to translate to provide compression of the seal elements. In a preferred embodiment, axial compression of the seal elements deforms the elements radially outwards into contact with the circumferential wall of the pipe to provide a seal therebetween. Alternatively or in addition, the seal actuator may be adapted to translate by application of a pressure differential across the actuator. The pressure differential may be induced by applying or providing an elevated pressure outboard of the seal unit in the pipe. Alternatively, or in addition, the differential pressure may be induced by venting fluid to create a lower pressure region inboard of the seal unit.

The seal unit may include an annular ring located around a central portion of the seal unit and between the seal elements.

In use, the seal unit may be adapted to define an annular volume or chamber between the seal elements, the annular ring and the pipe. The annular ring may include a fluid conduit adapted for communication with the volume. The fluid conduit may include a bleed port adapted to permit fluid to be bled from the annular volume. The seal integrity may be pressure tested by monitoring the pressure in the annular chamber.

The tool may be adapted for isolating a pipe in high pressure applications, for example isolating a pipe section against up to approximately 200 bar differential pressure. Alternatively, the tool may be utilized in low pressure applications.

The tool may be adapted to be removable from the pipe, typically through the opening through which the tool was introduced into the pipe. In a preferred embodiment of the present invention, the seal elements may be deactivated by deactivating a seal actuator, for example by bleeding off fluid from an actuating piston.

Alternatively, or in addition, the seal elements may be adapted to be deactivated by application of pressure on the actuator, for example by application of pressure on the inboard side of the fluid piston. On equalization of pressure across the seal unit, the tool may be removed from the pipe.

The tool may be adapted to be removed from the pipe via a hot tap connection.

According to a further aspect of the present invention, there is provided a method of isolating a section of a pipe, the method including the steps of inserting a seal unit into the pipe through an opening in the wall of the pipe, the seal unit including at least two seal elements; and actuating the seal elements to isolate a section of the pipe and maintaining the isolation of the section of the pipe using a lock arrangement configured to prevent de-activation of the seal elements.

The lock arrangement may be configured to prevent the axial compression of the seal elements from releasing, for example in the case of a combination of loss of hydraulic set pressure and the differential pressure across the seal head dropping below the seal energization pressure necessary to maintain seal activation from differential pressure alone.

Actuating the seal elements may include radially extending the elements from a retracted configuration.

The method may further include the step of applying an elevated pressure to a volume between the seal elements to test the pressure integrity of both seal elements.

The method may further include the step of rotating the seal unit after insertion into the pipe to align the seal elements with the pipe axis.

The method may further include the step of forming an opening in a wall of a pipe, which may be achieved by hot tapping.

It should be understood that the features defined above in accordance with any aspect of the present invention or below in accordance with any specific embodiment may be utilized, either alone or in combination with any other defined feature, in any other aspect of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
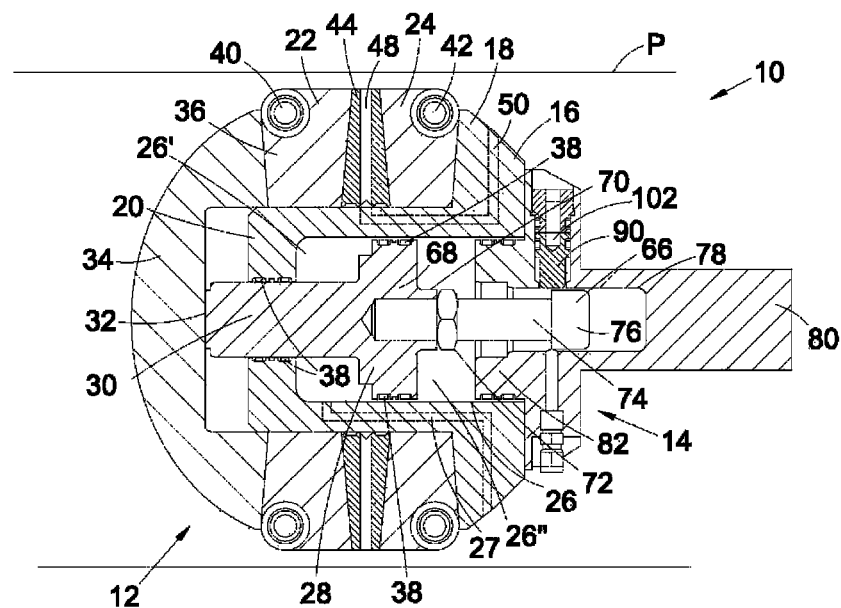
FIG. 1 is a diagrammatic view of an isolation tool assembly according to an embodiment of the present invention.
Figure 2:
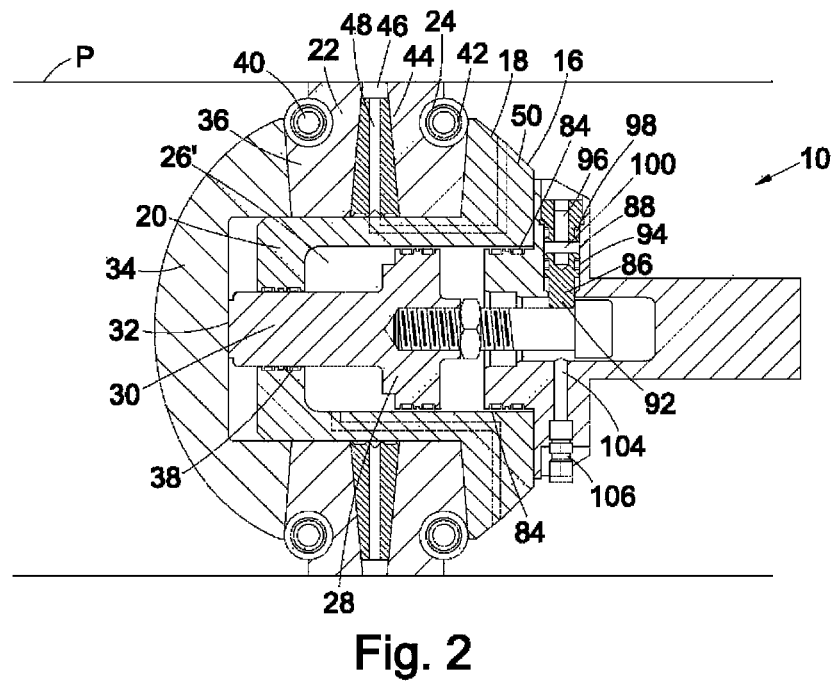
FIG. 2 is a diagrammatic view of the isolation tool assembly shown in FIG. 1, shown in deployed configuration.

Referring first to FIGS. 1 and 2, there is shown an isolation tool assembly 10 according to an embodiment of the present invention, shown within a section of a pipe P. FIG. 1 shows the tool assembly prior to activation and FIG. 2 shows the tool assembly in deployed configuration. The assembly 10 has a seal unit in the form of spherical globe seal module 12 and a lock arrangement 14.

The seal module 12 includes a first body portion 16 defining a seal support disc 18 and a central seal support core 20, and two annular elastomeric compression seal elements 22,24 mounted on the body portion 16.

The seal support core 20 defines a cylinder 26 which accommodates a seal actuating piston 28. An outboard portion 26' of the cylinder 26 is in communication with a fluid supply passage (shown by dotted lines 27), while an inboard portion 26" of the cylinder 26 is at atmospheric pressure. The inboard portion 26" of the cylinder 26 is also in communication with a fluid supply to permit application of pressure to assist in release of the tool assembly 10.

A piston rod or actuator 30 extends from the piston 28 and has a leading end 32 coupled to a second body portion 34 which defines the leading face of the seal module 12, and also defines an annular seal energizing face 36. Seals 38 are provided between the piston 28 and the first body portion 16. The seal elements 22,24 are located between the seal energizing face 36 and the seal support disc 18.

The seal elements 22,24 each include anti-extrusion springs 40,42 which lie within the outer diameters of the seal support disc 18 and the seal energizing face 36.

The seal module 12 further includes an annular ring 44 disposed on the seal support core 20 between the elastomeric seal elements 22,24. The ring 44, seal elements 22,24 and inner face of the pipe P collectively define an annular volume or chamber 46 (shown in FIG. 2). When the seal elements 22,24 are energized (as shown in FIG. 1), a fluid supply passage 48 within the annular ring 44 is in communication with a fluid conduit (shown by dotted line 50) in the first body portion 16.

Figure 3:
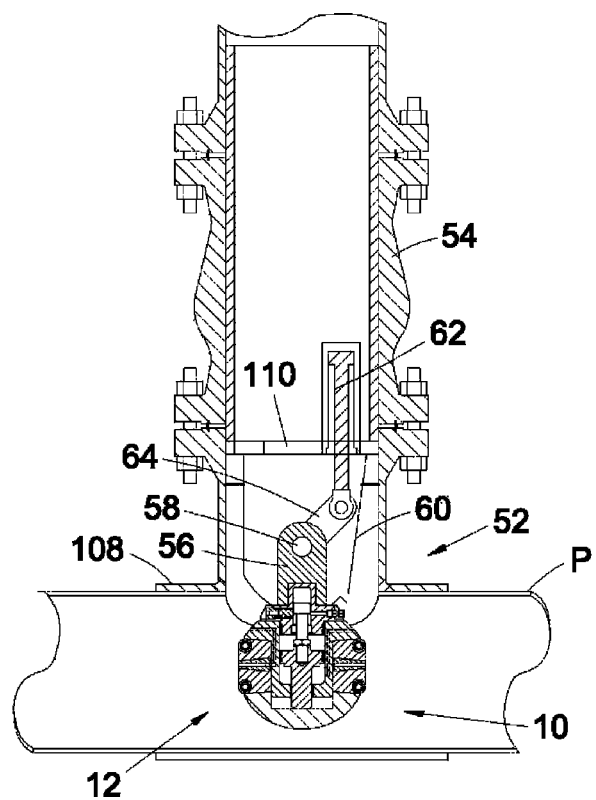
FIG. 3 is a cross sectional view of the isolation tool assembly shown in FIGS. 1 and 2, located within a hot tapped section of pipe.
Figure 4:
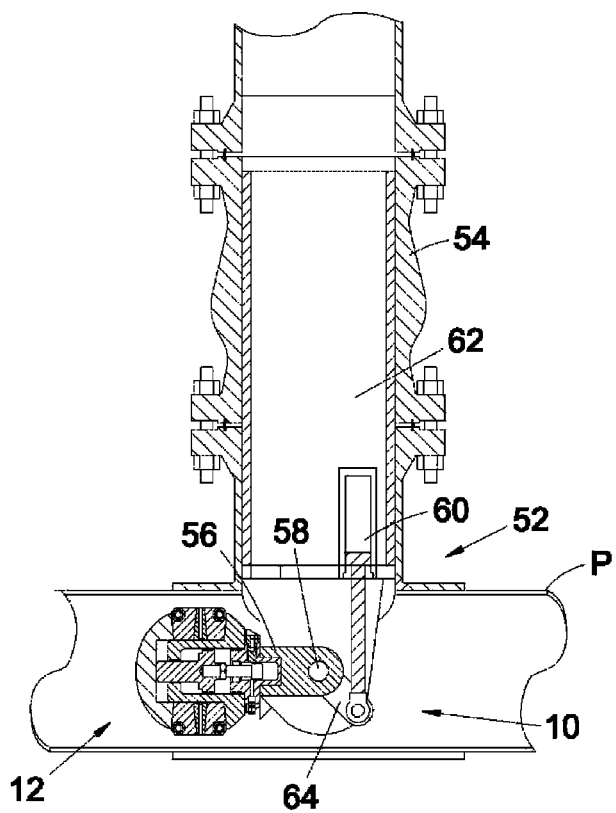
FIG. 4 is a cross sectional view of the isolation tool assembly shown in FIGS. 1 to 3, shown rotated through 90 degrees.
Figure 5:
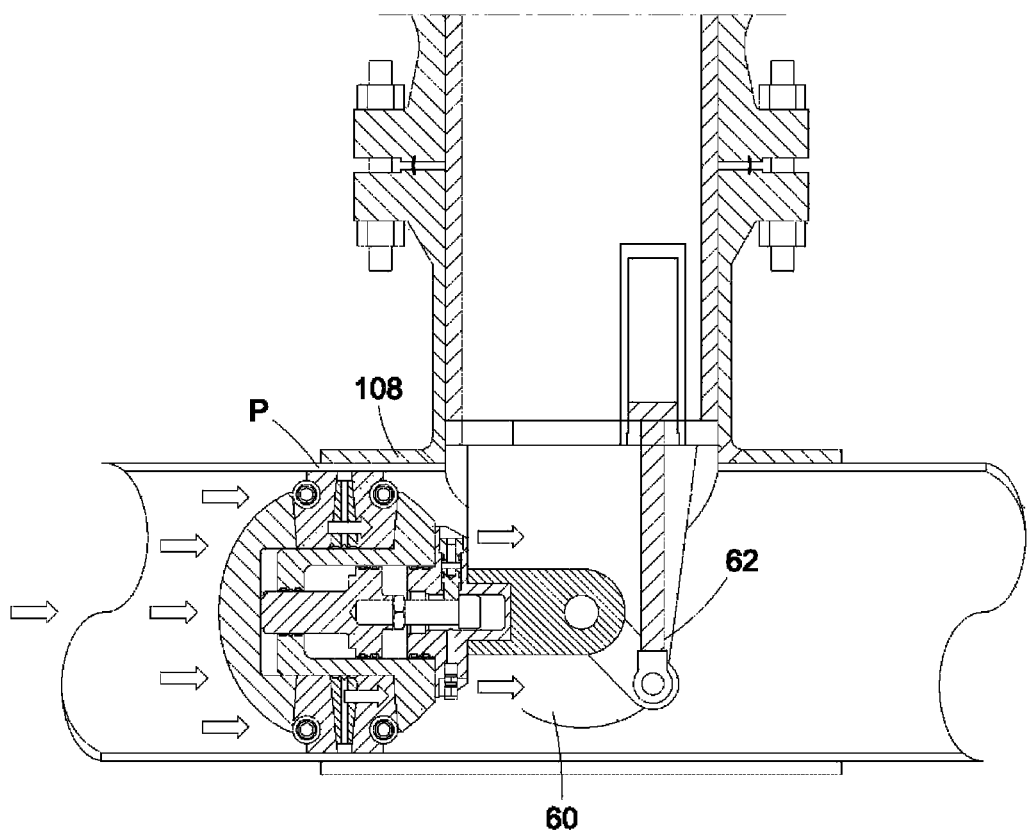
FIG. 5 is a cross sectional view of the isolation tool assembly shown in FIGS. 1 to 4, shown in deployed configuration, with arrows representing the self-energization load path through the tool.

Referring now also to FIGS. 3 to 5, as shown a tee or branch connection 52 has been created in the pipe P by hot tapping, and the assembly 10 inserted via the hot tap connection 52. The seal module 12 is mounted to a launching stem bar assembly 54 via a clevis 56, pivot or clevis pin 58 and padeye 60. The clevis 56 is shaped to conform to the form of the base of the padeye 60 where the padeye 60 joins the launching bar assembly 54 so as to provide maximum surface contact when the seal module 12 is oriented towards the outboard end of the pipe P, as illustrated in FIGS. 3 and 4. Furthermore, the seal module 12 is coupled to the launching assembly 54 by a hydraulic ram 62 via a crank arrangement 64, actuating the ram 62 causing the seal module 12 to rotate between an initial insertion orientation, parallel to the branch axis (as shown in FIG. 3), and a sealing orientation, parallel to the pipe axis (as shown in FIG. 4).

Referring again to FIGS. 1 and 2, the lock arrangement 14 includes a lock member in the form of a spigot or cap screw 66 mounted in a bore 68 provided in a rear portion 70 of the piston 28. The cap screw 66 is held in place by a retainer in the form of lock nut 72, although the cap screw 66 may be held in place by any suitable retainer or may be self supporting. The cap screw 66 has a shank portion 74 and a head portion 76 at a distal end (that is the end furthest from the piston 28).

The cap screw 66 extends into a bore 78 provided in a lock body 80. In the embodiment shown, the lock body 80 forms part of the clevis 56. However, the lock body 80 may alternatively be a separate component. The lock body 80 has a boss portion 82 which extends into the end of the cylinder 26 formed in the first body portion 16. Seals 84 are provided between the boss portion 82 of the lock body 80 and the cylinder 26.

The lock arrangement 14 further includes a lock piston 86 slidably located within a transverse or radial bore 88, the radial bore 88 arranged substantially perpendicularly to the bore 68. The lock piston 86 has a head 90 and a shank 92. An annular seal 94 is provided around the head 90, sealing the head 90 against the bore 88. The bore 88 is sealed by a cap 96 with annular seal 98; the head 90, lock body 80 and lock piston 86 forming a cylinder 100 for receiving fluid to urge the lock piston 86 towards the cap screw 66. The head 90 of the lock piston 86 is also provided with a coupler 102 which may be used for locating the lock piston 86 into/out from the bore 88 during assembly or maintenance and/or permitting manual manipulation of the lock piston 86 into or out of engagement with the cap screw 66.

A fluid passage 104 and connector 106 are provided on an opposing side of the lock body 80. The fluid passage 104 is positioned to permit fluid to be directed to the lock piston 86 in order to disengage the lock piston 86.

Operation of the isolation tool assembly 10 will now be described further with reference to FIGS. 1 to 5 of the drawings.

In use, a hot tap is performed by any appropriate method. In the illustrated embodiment, a saddle 108 has been welded to the pipe P, and a short length of flanged pipe welded to the saddle 108. A valve 110 has been bolted to the pipe P and the pipe P tapped to form a branch or tee. The tool assembly 10 has then been run into the pipe P through the open valve 110 with the seal elements 22, 24 in a retracted configuration. The seal module 12 is initially aligned with the branch axis and is advanced into the pipe P until the module 12 is located in the pipe P, as illustrated in FIG. 3. The hydraulic ram 62 is then actuated to translate and rotate the crank arrangement 64, which in turn rotates the seal module 12 via the clevis 56 through approximately 90 degrees to orientate the seal module 12 towards the outboard end of the pipe P. At the same time the launching stem bar assembly 54 is advanced to locate the padeye 60 within the pipe P. The rotation mechanism provides accurate control over the location of the seal module 12 within the pipe P and prevents damage to the seal module 12 and/or the pipe P.

The seal elements 22, 24 are initially retained in a radially retracted configuration by the anti-extrusion springs 40, 42. However, if hydraulic pressure is applied to the outboard portion of the cylinder 26, the piston 28 is retracted into the first body portion 16, causing the second body portion 34 to compress the seal elements 22, 24. The seal elements 22, 24 expand radially to engage the pipe wall, as illustrated in FIGS. 2 and 5 of the drawings.

Once an initial seal has been formed between the pipe wall and the seal elements 22, 24, and pressure is bled off inboard of the seal module 12, the differential pressure across the module 12 urges the second body portion 34 to compress the seal elements 22, 24. It will be observed that the differential pressure acts over a relatively large area compared to the smaller cross-sectional area of the seal elements 22, 24, such that the rubber pressure is maintained above the pressure differential, so preventing fluid bypass. This also prevents fluid pressure from migrating the seals 22, 24, so preventing explosive decompression. Also, the relatively large diameter of the annular ring 44 ensures that the extrusion gap is minimal, such that there is no need to provide anti-extrusion mechanisms in the center of the tool assembly 10, facilitating the provision of compact seal elements 22, 24.

Pressure forces acting on the seal module 12 are resisted by compressive contact between the clevis 56 and the padeye 60, the surfaces of the clevis 56 and padeye 60 being adapted to provide maximum surface contact on full articulation. The pressure load on the padeye 60 is supported by the launching stem bar assembly 54, and by the tee. Although the clevis pin 58 can support isolation loads, particularly for lower pressure applications, the configuration is such that more significant loads are transferred directly to the padeye 60. The clevis pin 58 may also be adapted to resist backpressure.

The annular chamber 46 defined between the seal elements 22, 24, the annular ring 44 and the inner wall of the pipe P may be pressurized and then monitored to test the integrity of both seal elements. Once seal integrity has been tested, to a pressure which may be in excess of the differential pressure, operations may be carried out safely inboard of the module 12.

As shown most clearly in FIG. 2, once the seal elements 22, 24 have been activated, fluid may be applied to cylinder 100 to urge lock piston 86 towards cap screw 66. The cap screw head portion 76 is thus prevented from moving beyond the lock piston 86, that is to a position which would result in deactivation/loss in sealing engagement of the seal elements 22, 24 with the pipe P.

On completion of the operation, fluid may be applied to the lock piston 86 via connector 106 and passage 104 to urge the lock piston 86 away from the cap screw, thereby permitting the cap screw 66 to return to a position in which the seal elements 22, 24 are deactivated. The tool assembly 10 may then be removed from the pipe P via the hot tap connection 52.

It will be apparent to those of skill in the art that the above-described tool provides two bi-directional seal elements in a single unit, and thus provides for double block and bleed isolation of a pipe P via a single intervention, reducing the operation time and cost involved in isolating the required section of pipe P. Moreover, the lock arrangement is configured to prevent undesired deactivation of the seal elements 22, 24 where the pressure applied across the seal elements drops below a seal self-energization pressure. Embodiments of the present invention thus provide the additional benefit of providing fail-safe operation in applications where the pressure acting across the tool is insufficient to maintain self-energization of the seal elements, for example, facilitating double block and bleed capability in low pressure or ambient pressure pipe isolations.

It should be understood that the embodiment described herein is merely exemplary and that various modifications may be made thereto without departing from the scope of the invention.

Figure 6:
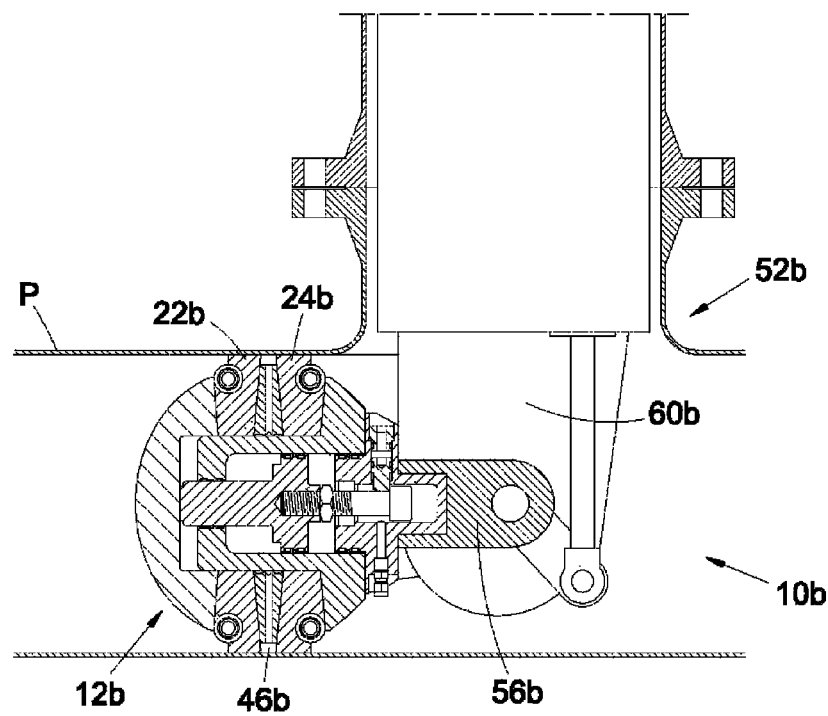
FIG. 6 is a cross sectional view of an isolation tool assembly according to another embodiment of the invention, shown in deployed configuration.
Figure 7:
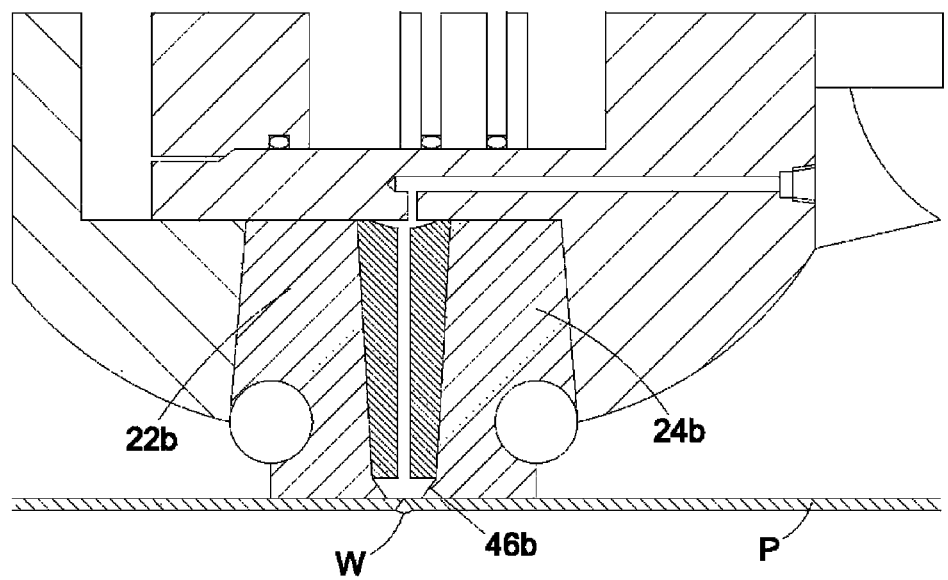
FIG. 7 is an enlarged cross sectional view of part of the tool assembly shown in FIG. 6.

For example, and referring now to FIGS. 6 and 7, there is shown a cross sectional view of an isolation tool assembly 10b in accordance with another embodiment of the present invention. FIG. 7 shows an enlarged view of part of the assembly 10b. It will be recognized that the embodiment of FIGS. 6 and 7 is similar to the embodiment of FIGS. 1 to 5 such that like components are indicated by like numerals followed by a "b".

As noted hereinabove, the position of the seal unit 12b in the pipe P is controlled by the location linkage, the location linkage including, in the illustrated embodiment, a clevis 56b and padeye 60b. Thus, the tool assembly 10b may be configured to locate the seal unit 12b within the pipe P to locate seal elements 22b, 24b accurately at a position within range of a branch connection 52b. This may be achieved by selecting or adjusting the geometry of the location linkage as appropriate.

In use, the tool assembly 10b may be configured such that the seal elements 22b, 24b will straddle a weld W located between the connection 52b and the pipe P. Once in position, the seal elements 22b, 24b may be energized as described hereinabove in respect of the first embodiment. An annulus or chamber 46b between the seal elements 22b, 24b may then be pressurized to pressure test the weld W via fluid passageway 50b.

Thus, the tool assembly 10b may be utilized as a joint, or weld test tool, for example, but not exclusively, for size on size tee fabrication. This may be achieved without the need to fluid fill and pressurize the rest of the pipe P. This process may be repeated, the tool assembly 10b being rotated by 180 degrees in order to test the opposite weld (not shown). Thus, the provision of a tool assembly 10b according to this embodiment of the present invention permits the connection 52b to be welded in-line and each weld W to be pressure tested without the need to install flanges for each connection point, with each connection requiring pressure testing.

Alternatively, or in addition, the tool assembly 10b may be used to pressure test between the seal elements 22b, 24b, for example, in order to pressure test a joint, weld or the like located between the seal elements 22b, 24b.

Insertion of the tool assembly 10 or 10b and full pressure testing of both seal elements 22, 24b or 22b, 24b does not require the cutting or provision of any additional pipe openings or seals. The seals may be activated as desired, in the illustrated embodiment by means of hydraulic pressure, and once activated the module 12 or 12b is configured such that differential pressure across the module 12 or 12b will further energise the seal elements 22, 24b or 22b, 24b.

The illustrated embodiment shows a welded hot tap tee, but the invention will of course have application with mechanical hot tap clamps. However, such clamps should be sufficiently robust to resist the axial loads that must be borne by the clamps. Also, the illustrated embodiment is shown in a fullbore hot tap. Other embodiments may be used on size-on-size tees.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. An isolation tool assembly for isolating a section of a pipe, the isolation tool assembly comprising:
   a seal unit adapted for location in a section of a pipe via an opening in a wall of the pipe and comprising at least two seal elements configured to engage the wall of the pipe to isolate the section of the pipe; and
   a seal actuator operable to urge the seal elements into sealing engagement with the pipe wall; and
   a lock arrangement operable to prevent de-activation of the seal elements to maintain isolation of the section of the pipe, the lock arrangement comprising a lock member coupled to or forming part of the seal actuator and a lock piston configured to engage the lock member to prevent movement of the seal actuator to a position which would deactivate the seal elements.

2. A method of isolating a section of a pipe, the method comprising the steps of:
   inserting a seal unit into a pipe through an opening in the wall of the pipe, the seal unit comprising at least two seal elements;
   actuating the seal elements using a seal actuator to isolate a section of the pipe; and
   maintaining the isolation of the section of the pipe using a lock arrangement configured to prevent de-activation of the seal elements, the isolation of the section of the pipe being maintained by engaging a lock piston with a lock member coupled to or forming part of the seal actuator, the engagement between the lock piston and the lock member preventing movement of the seal actuator to a position which would deactivate the seal elements.

3. The method of claim 2, wherein the step of actuating the seal elements includes radially extending the elements from a retracted configuration.

4. The method of claim 2, further comprising the step of applying an elevated pressure to a volume between the seal elements to test the pressure integrity of both seal elements.

5. The method of claim 2, further comprising rotating the seal unit after insertion into the pipe to align the seal elements with a longitudinal axis of the pipe.

6. The method of claim 2, further comprising the step of forming an opening in a wall of a pipe.

7. The method of claim 2, comprising moving the lock piston radially to engage the lock member.

8. The isolation tool assembly of claim 1, wherein the lock piston is radially mounted relative to the lock member and the seal actuator.

9. The isolation tool assembly of claim 1, wherein the lock piston is radially moveable to engage the lock member.

10. The isolation tool assembly of claim 1, wherein axial compression of the seal elements deforms the seal elements radially outwards into contact with a circumferential wall of the pipe to provide a seal therebetween.

11. The isolation tool assembly of claim 1, wherein at least one of the seal elements comprises a bi-directional seal.

12. The isolation tool assembly of claim 1, wherein the seal elements are adapted to be compliant to the pipe surface.

13. The isolation tool assembly of claim 1, wherein the seal elements are adapted to be self-energizing on the seal unit experiencing a predetermined differential pressure.

14. The isolation tool assembly of claim 1, wherein the seal elements are adapted to be initially compressed to provide at least initial isolation of the pipe.

15. The isolation tool assembly of claim 1, wherein at least one anti-extrusion spring is provided for each seal element.

16. The isolation tool assembly of claim 1, wherein the seal unit further comprises a location linkage.

17. The isolation tool assembly of claim 1, wherein the seal unit is rotatable.

18. The isolation tool assembly of claim 1, wherein the seal unit further comprises an annular ring located around a central portion of the seal unit and between the seal elements.

* * * * *